(12) United States Patent
Aramburo et al.

(10) Patent No.: US 10,028,619 B2
(45) Date of Patent: Jul. 24, 2018

(54) FOOD PROCESSOR WITH SPIRALIZER FEATURE

(71) Applicant: Sunbeam Products, Inc., Boca Raton, FL (US)

(72) Inventors: Julian Aramburo, Greenacres, FL (US); Joseph Palermo, Boynton Beach, FL (US)

(73) Assignee: Sunbeam Products, Inc., Boca Raton, FL (US)

( * ) Notice: Subject to any disclaimer, the term of this patent is extended or adjusted under 35 U.S.C. 154(b) by 226 days.

(21) Appl. No.: 14/883,437

(22) Filed: Oct. 14, 2015

(65) Prior Publication Data

US 2016/0101533 A1     Apr. 14, 2016

Related U.S. Application Data

(60) Provisional application No. 62/063,823, filed on Oct. 14, 2014.

(51) Int. Cl.
| | |
|---|---|
| *A47J 43/00* | (2006.01) |
| *A47J 43/04* | (2006.01) |
| *B26D 3/11* | (2006.01) |
| *A47J 43/07* | (2006.01) |
| *A47J 43/046* | (2006.01) |

(52) U.S. Cl.
CPC ............. *A47J 43/04* (2013.01); *A47J 43/046* (2013.01); *A47J 43/0722* (2013.01); *A47J 43/0788* (2013.01); *B26D 3/11* (2013.01)

(58) Field of Classification Search
CPC ...... A47J 43/04; A47J 43/046; A47J 43/0716; A47J 43/0783; A47J 43/0788; B26D 3/11

USPC .......................................................... 241/92
See application file for complete search history.

(56) References Cited

U.S. PATENT DOCUMENTS

| | | | | |
|---|---|---|---|---|
| 2,678,073 | A | | 5/1954 | Nardis |
| 4,190,208 | A | * | 2/1980 | Schaeffer ................ A47J 43/06 241/282.2 |
| 4,199,112 | A | * | 4/1980 | McLean .................. A47J 43/06 241/273.2 |
| 4,227,655 | A | | 10/1980 | Williams |
| 4,369,680 | A | | 1/1983 | Williams |
| 4,471,915 | A | | 9/1984 | Levin et al. |
| 4,544,103 | A | | 10/1985 | Breeden |
| 4,799,626 | A | | 1/1989 | Hickel et al. |
| 5,921,485 | A | * | 7/1999 | Plavcan .............. A47J 43/0777 241/282.2 |
| 5,992,287 | A | | 11/1999 | Dube |
| 7,252,252 | B2 | | 8/2007 | Mauch et al. |

(Continued)

*Primary Examiner* — Faye Francis
(74) *Attorney, Agent, or Firm* — Seth M. Blum (57) ABSTRACT

A food processor for cutting a food ingredient includes: a motorized base for generating a rotational force; a processor bowl removably attached to the motorized base; a spindle within the processor bowl in which the spindle can be rotated by the rotational force from the motorized base; a spiralizer cutter attached to the spindle within the processor bowl, the spiralizer cutter having a blade along a radius of the spiralizer cutter; a lid for the processor bowl, the lid having a center position corresponding to the spindle and a radial position between the center position and an edge of the lid; and a feed tube for positioning at one of the center position and the radial position, wherein the feed tube can be repositioned between the center and radial positions.

6 Claims, 8 Drawing Sheets

(56) References Cited

U.S. PATENT DOCUMENTS

| | | | |
|---|---|---|---|
| 7,644,883 B2 | 1/2010 | Mauch et al. | |
| 7,686,240 B2 * | 3/2010 | Pryor, Jr. ............ | A47J 43/0716 241/282.1 |
| 8,677,895 B2 * | 3/2014 | Beber .................. | A47J 43/0711 241/101.1 |
| 8,733,239 B2 * | 5/2014 | Allen .................... | A47J 43/046 241/151 |

* cited by examiner

FOOD PROCESSOR WITH SPIRALIZER FEATURE

This invention claims the benefit of U.S. Provisional Patent Application No. 62/063,823 filed on Oct. 14, 2015, which is hereby incorporated by reference in its entirety.

BACKGROUND OF THE INVENTION

Field of the Invention

Embodiments of the invention relate to a food processor, and more particularly, to a food processor having a spiralizer feature.

Discussion of the Related Art

In general, a food processor is used to slice, grate, chop or otherwise cut a food ingredient, such as vegetables, fruits, nuts and meats. Typically, food processors have a disc at the top of a bowl in which the disc has a blade system at and along a single radius of the disc for cutting a food ingredient. A lid on the bowl covers the disc. Typically, the lid includes a feed tube for providing a food ingredient into the bowl as the disc is rotated such that the blade system can slice, grate, chop or otherwise cut the food ingredient, which then falls to the bottom of the bowl.

The disc is rotated on a spindle at the center of the bowl. The feed tube in the lid is offset from the spindle such that the food ingredient is only provided into the blade system only at a radius of the disc outside of a central area of the disc in which the spindle is attached. The bowl sits on a base housing a motor. The spindle is turned directly by the motor in the base positioned underneath the bowl or indirectly through either a gear drive system or a belt/pulley system in the base driven by the motor located in the base next to the bowl. In addition to or in the alternative to rotating the disc with the top blade system, the spindle can rotate a lower blade system at the bottom of the bowl for mixing food ingredients or additional cutting of a food ingredient.

The food processor can cut a food ingredient into different types of resultant shapes depending on the type of blade system implemented. For example, numerous grating openings offset from each other on adjacent radii of the disc can grate the carrot. In another example, a single straight blade along a single radius of the disc can cut a carrot into chips. In the alternative, another straight blade at another radius in addition to the single straight blade at the single radius, such as another straight blade being at the radius opposite to the single radius, can cut the carrot into chips twice as fast. In yet another example, a straight blade along one radius of the disc followed closely by a series of vertical blade along another radius of the disc can cut the carrot into flat strips. Such gratings, chips, or flat strips can include the core of the carrot. In many types of fruits and vegetables, the core may not be desirable for consumptions. That is, there are fruits and vegetables that one may want to decore and cut to result in shapes without the core of the food ingredient, such as apples, onions, pears, carrots, cucumbers.

Typically, the length or overall diameter of a food ingredient resulting from a food processor is only as long as the overall cross-sectional width of the food ingredient provided through the feed tube to the blade system at a single radius of the disc. In addition, the overall cross-sectional width of the food ingredient is less than the single radius of the disc at which the food ingredient is being cut. Thus, a food ingredient provided through the feed tube to the blade system at a single radius of the disc can not spiral slice, much less spiral stripped.

SUMMARY OF THE INVENTION

Accordingly, embodiments of the invention are directed to a food processor that substantially obviates one or more of the problems due to limitations and disadvantages of the prior art.

An object of embodiments of the invention is to provide a food processor that can spiral cut a food ingredient into spiral strips.

Another object of embodiments of the invention is to provide a food processor that can either spiral cut a food ingredient into spiral strips or straight cut a food ingredient into that strips.

Another object of embodiments of the invention is to provide a food processor to spiral cut a food ingredient into spiral strips and decore the food ingredient.

Additional features and advantages of embodiments of the invention will be set forth in the description which follows, and in part will be apparent from the description, or may be learned by practice of embodiments of the invention. The objectives and other advantages of the embodiments of the invention will be realized and attained by the structure particularly pointed out in the written description and claims hereof as well as the appended drawings.

To achieve these and other advantages and in accordance with the purpose of embodiments of the invention, as embodied and broadly described, a food processor for cutting a food ingredient includes: a motorized base for generating a rotational force; a processor bowl removably attached to the motorized base; a spindle within the processor bowl in which the spindle can be rotated by the rotational force from the motorized base; a spiralizer cutter attached to the spindle within the processor bowl, the spiralizer cutter having a blade along a radius of the spiralizer cutter; a lid for the processor bowl, the lid having a center position corresponding to the spindle and a radial position between the center position and an edge of the lid; and a feed tube for positioning at one of the center position and the radial position, wherein the feed tube can be repositioned between the center and radial positions.

In another aspect, a food processor for cutting a food ingredient includes: a motorized base for generating a rotational force; a processor bowl removably attached to the motorized base; a tube within the processor bowl in which the tithe can be rotated by the rotational force from the motorized base; the tube having a top opening at one end and a side opening in a side of the tube adjacent to an other end; a spiralizer cutter attached to the one end of the tube; a lid for the processor bowl; a central opening in the lid corresponding to a central portion of the spiralizer cutter and the top opening of the tube; a radial opening in the lid positioned between the central opening and an edge of the lid; a cover for overlapping the central opening and the radial opening: and a feed tube located on the cover, wherein the cover can be rotated to position the feed tube at one of the central opening and the radial opening.

In another aspect, a food processor for cutting a food ingredient includes: a motorized base for generating a rotational force; a processor bowl removably attached to the motorized base; a tube within the processor bowl in which the tube can be rotated by the rotational force from the motorized base; the tube having a top opening at one end and a side opening in a side of the tube adjacent to an other end of the tube; a spiralizer cutter attached to the one end of the tube such that the top opening of the tube is centrally located to the spiralizer cutter; a lid for the processor bowl; a central opening in the lid corresponding to a central portion of the spiralizer cutter and the top opening of the tube; a radial opening in the lid positioned between the central opening and an edge of the lid; a cover for overlapping the central opening and the radial opening; and a feed tube located on the cover, wherein the cover can be rotated to position the feed tube at one of the central opening and the radial opening.

In yet another aspect, a blade system for cutting a food ingredient includes: a tube having one end and an other end opposite to the one end; a top opening at one end of the tube for decoring the food ingredient; a spiralizer cutter at one end of the tube and extending from the tube with a radius; a series of vertical blades on one side of the radius for cutting the food ingredient into strips; and a horizontal blade on an other side of the radius for further cutting the food ingredient into one of flat strips and spiral strips.

It is to be understood that both the foregoing general description and the following detailed description are exemplary and explanatory and are intended to provide further explanation of embodiments of the invention as claimed.

BRIEF DESCRIPTION OF THE DRAWINGS

The accompanying drawings, which are included to provide a further understanding of embodiments of the invention and are incorporated in and constitute a part of this specification, illustrate embodiments of the invention and together with the description serve to explain the principles of embodiments of the invention.

DETAILED DESCRIPTION OF THE PREFERRED EMBODIMENTS

Reference will now be made in detail to the preferred embodiments of the invention, examples of which are illustrated in the accompanying drawings. The invention may, however, be embodied in many different forms and should not be construed as being limited to the embodiments set forth herein; rather, these embodiments are provided so that this disclosure will be thorough and complete, and will fully convey the concept of the invention to those skilled in the art. In the drawings, the thicknesses of layers and regions may be exaggerated for clarity.

The invention concerns a food processor including a motorized base and a detachable processor bowl. The motorized base includes a motor and controls, either electronic or manual, for controlling the speed of the motor. The processor bowl can be a transparent container made of either glass or plastic. Further, the processor bowl can have a handle. The processor bowl is removably detachable from the motorized base for ease in cleaning the processor bowl.

The motorized base can receive the processor bowl and can impart the rotational power of the motor as a rotational force to a spindle extending through the center of the processor bowl. The spindle can be a decore tube having a top opening at one end and a side opening in a side of the decore tube adjacent to an other end of the decore tube near the bottom of the processor bowl. A spiralizer cutter can be attached at or adjacent to the one end of the tube such that the top opening of the tube is centrally located in the spiralizer cutter. The decore tube rotates the spiralizer cutter at the top of the processor bowl using the rotational force from the motorized base. The spiralizer cutter includes a spiralizer blade system that can either straight cut a food ingredient into flat strips or spiral cut a food ingredient into spiral strips depending on the location at which the food ingredient is introduced into the spiralizer blade system. Further, a spiralizer blade system with a decore tube spindle can either straight cut a food ingredient into flat strips or spiral cut a food ingredient into spiral strips while decoring the food ingredient depending on the location at which the food ingredient is introduced into the spiralizer blade system.

Figure 1:
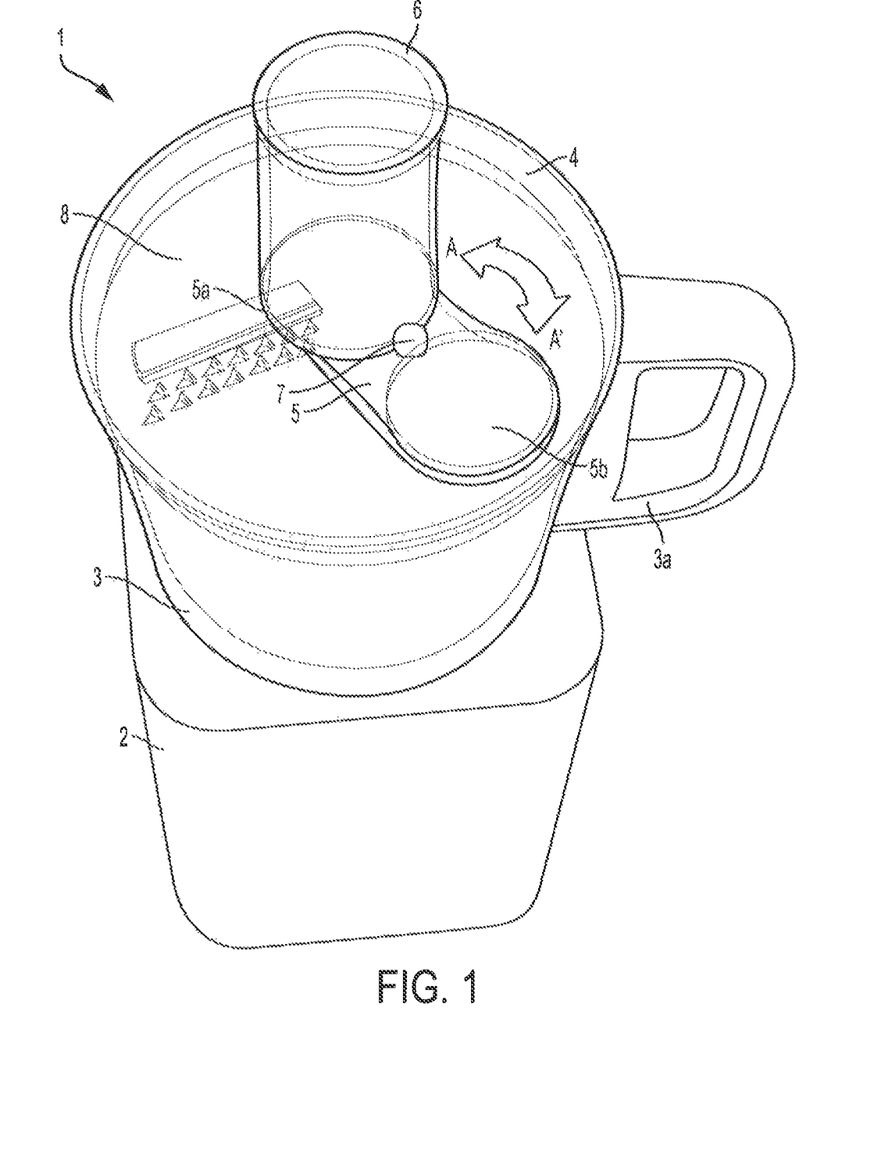
FIG. 1 is a top off-angle perspective view of a food processor with the feed tube at a central position that is useful for understanding the invention.
Figure 2:
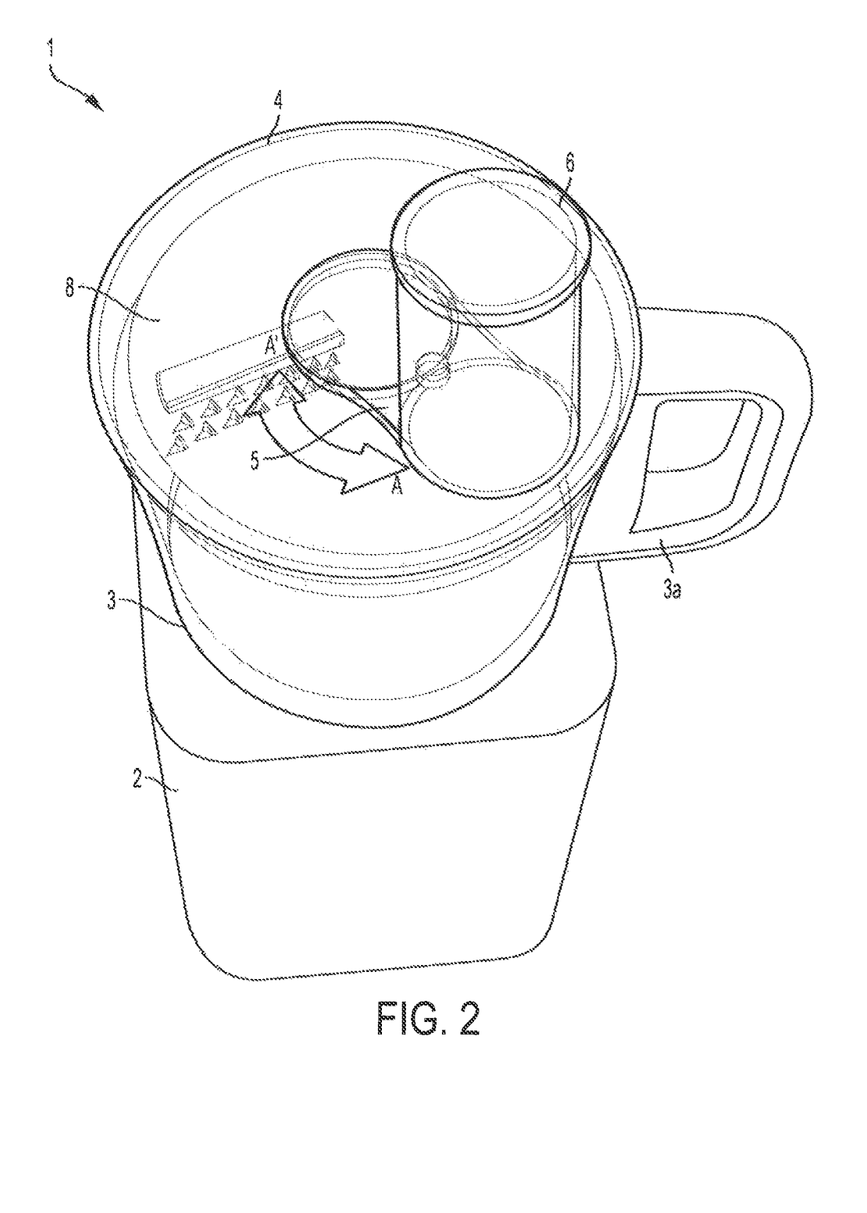
FIG. 2 is a top off-angle perspective view of a food processor with the feed tube at a radial position that is useful for understanding the invention.

FIG. 1 is a top off-angle perspective view of a food processor with the feed tube at a central position that is useful for understanding the invention. FIG. 2 is a top off-angle perspective view of a food processor with the feed tube at a radial position that is useful for understanding the invention. As shown in FIGS. 1 and 2, a food processor 1 includes a base 2 on which a processor bowl 3 is received. The processor bowl 3 is removably attached to the base 2. The processor bowl 3 has a lid 4 for enclosing the processor bowl 3 to keep food ingredients (not shown) within the processor bowl 3. A cover 5 on the lid 4 has a feed tube 6 to assist in introducing a food ingredient into the processor bowl 3. The cover 5 is rotatable A-A about a pivot point 7. A spiralizer cutter, which can be in the shape of a disc 8, is located at the top of the processor bowl 3 and atop a spindle (not shown) at the center of the processor bowl 3. The spiralizer cutter 8 is rotated through the spindle (not shown) by a rotational force generated by a motor (not shown) in the base 2.

The cover 5 is rotatable A-A' such that the feed tube 6 can be moved to a center position corresponding to the center of the spiralizer cutter 8 or a radial position between the center position and an edge of the lid 4. As shown in FIG. 1, the feed tube 6 can be positioned at a central position such that a food ingredient (not shown) provided through the feed tube 6 will be introduced into the center of the spiralizer cutter 8 such that the food ingredient can be decored and cut into spiral strips as the spiralizer cutter 8 rotates. As shown in FIG. 2, the feed tube 6 can be positioned at a radial position such that a food ingredient (not shown) provided through the feed tube 6 will be introduced into the center of the spiralizer cutter 8 and cut into flat strips as the spiralizer cutter 8 rotates.

Figure 3:
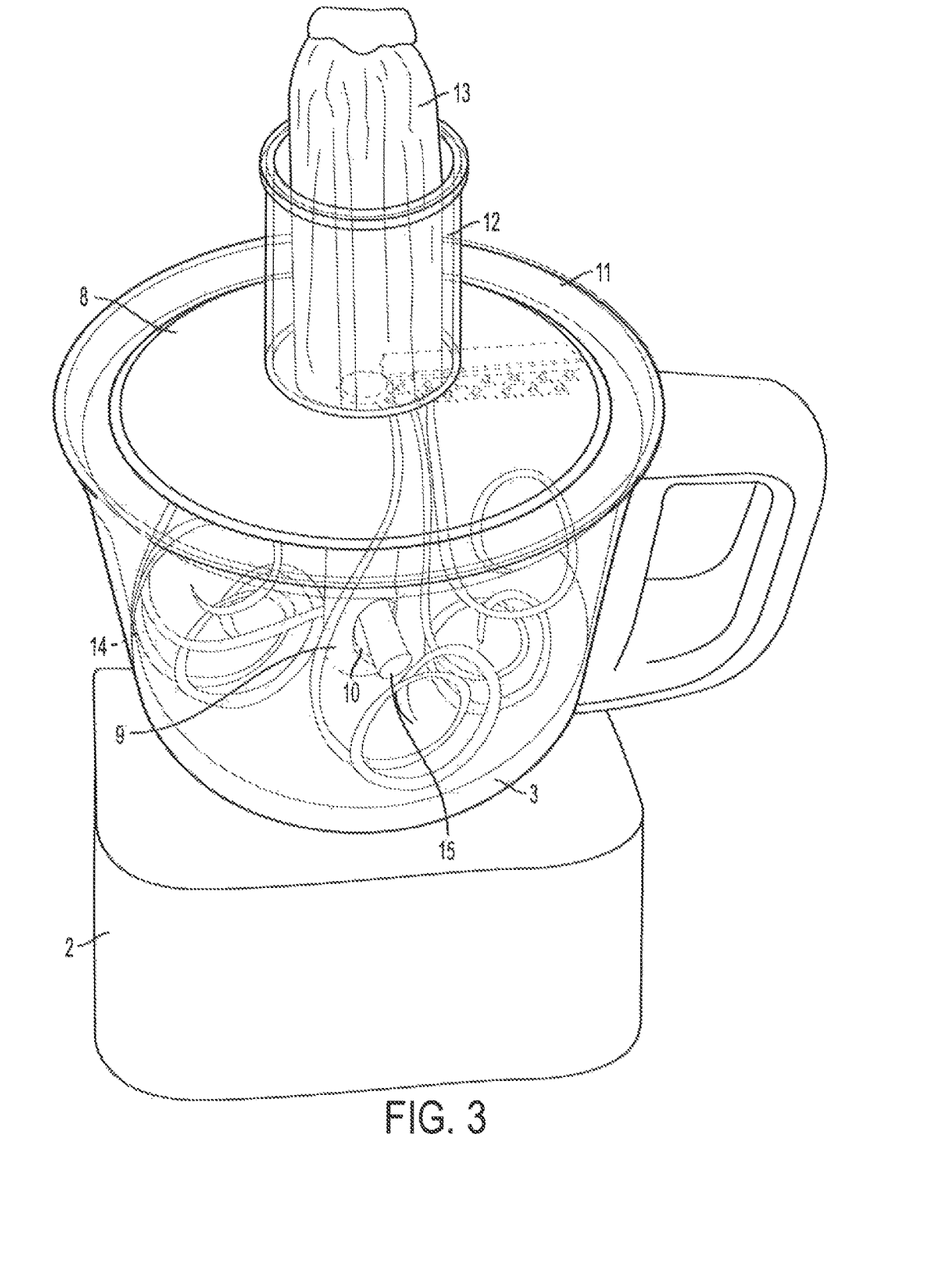
FIG. 3 is a side off-angle perspective view of a food processor with the feed tube of the lid in a central position receiving a food ingredient that is useful for understanding the invention.

FIG. 3 is a side off-angle perspective view of a food processor with the feed tube of the lid in a central position receiving a food ingredient that is useful for understanding the invention. As shown in FIG. 3, a food ingredient 13, such as zucchini, can be provided through the feed tube 12 located at a central position of the lid 11. The feed tube 6 can be concentric to the spindle 9 when the feed tube 12 is located at the central position of the lid 11.

The spiralizer cutter 8 is rotated by a spindle 9, which can be a hollow tube for decoring. Such a hollow tube spindle 9, as shown in FIG. 3 can be referred to as a decore tube 9. As the food ingredient 13 is provided through the feed tube 12 to the center of the spiralizer cutter 8 spun by a decore tube spindle 9, the food ingredient 13 can be cut into spiral strips 14 and a core 15. The spiral strips 14 can fall into the processor bowl 3 after being cut and the core 15 can be fed out a hole 10 near the bottom of the hollow tube spindle into the processor bowl 3.

In an alternative, the spiralizer cutter (not shown) is rotated by a spindle (not shown), which can be a solid core column (not shown). As the food ingredient 13 is provided through the feed tube 12 to the center of the spiralizer cutter (not shown) spun by a solid core column spindle (not shown), the entire width of the food ingredient 13 can be cut into spiral strips (not shown). Such spiral strips (not shown) of the entire width of the food ingredient 13 can then fall into the processor bowl 3 after being cut. The top of such a solid core column spindle (not shown) can be cone-shaped (not shown) to direct the core of the food ingredient into the spiralizer cutter (not shown) to be cut into spiral strips.

Figure 4:
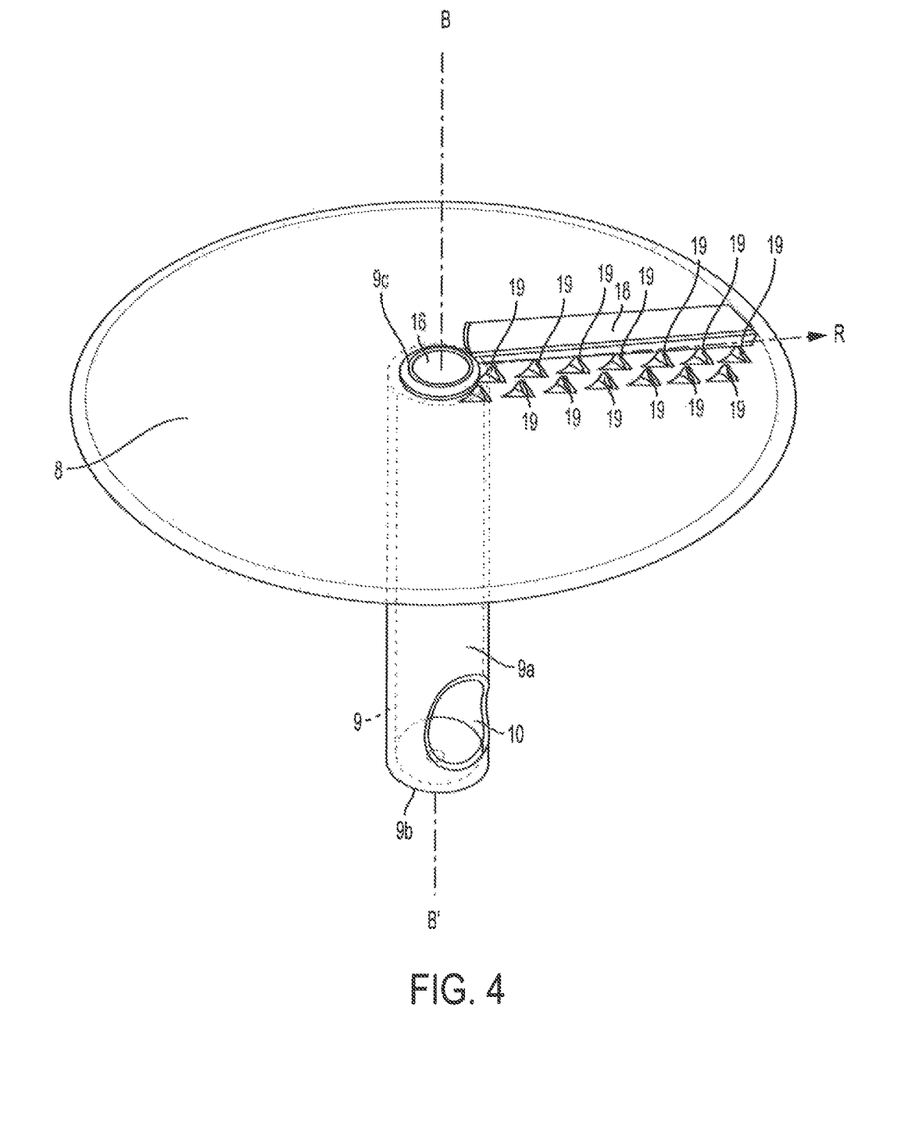
FIG. 4 is a side-off perspective view of a spiralizer cutter on a decore tube spindle that is useful for understanding the invention.

FIG. 4 is a side-off perspective view of a spiralizer cutter on a decore tube that is useful for understanding the invention. As shown in FIG. 4, the decore tube 9 can be centered about an axis B-B'. The sidewall 9a of the decore tube 9 has an opening 10 from which the core of a food ingredient (not shown) can extrude. The opening 10 in the sidewall 9a of the decore tube 9 can be near the bottom 9b of the decore tube 9. The top 9c of the decore tube 9 can have an opening 16 for decoring the food ingredient (not shown).

As also shown in FIG. 4, a spiralizer cutter 8 can be attached atop the decore tube 9 and about the opening 10 of the decore tube 9. The spiralizer cutter 8 can extend from the decore tube 9 and have a radius R. A blade system can be located along the radius R of the spiralizer cutter 8. The center axis A-A' of the decore tube 9 can be perpendicular to the radius R of the spiralizer cutter 8. The blade system of the spiralizer cutter 8 can be a horizontal blade 18 on one side of the radius R and a series of vertical blades 19 on the other side of the radius R. As the spiralizer cutter 8 rotates in a clockwise direction about the decore tube 9, the vertical blades 19 can first cut into the food ingredient (not shown) and then the horizontal blade 18 can spiral cut the vertical sliced portion of the food ingredient into spiral strips, which the horizontal blade 19 then directs the spiral strips downward.

Figure 5:
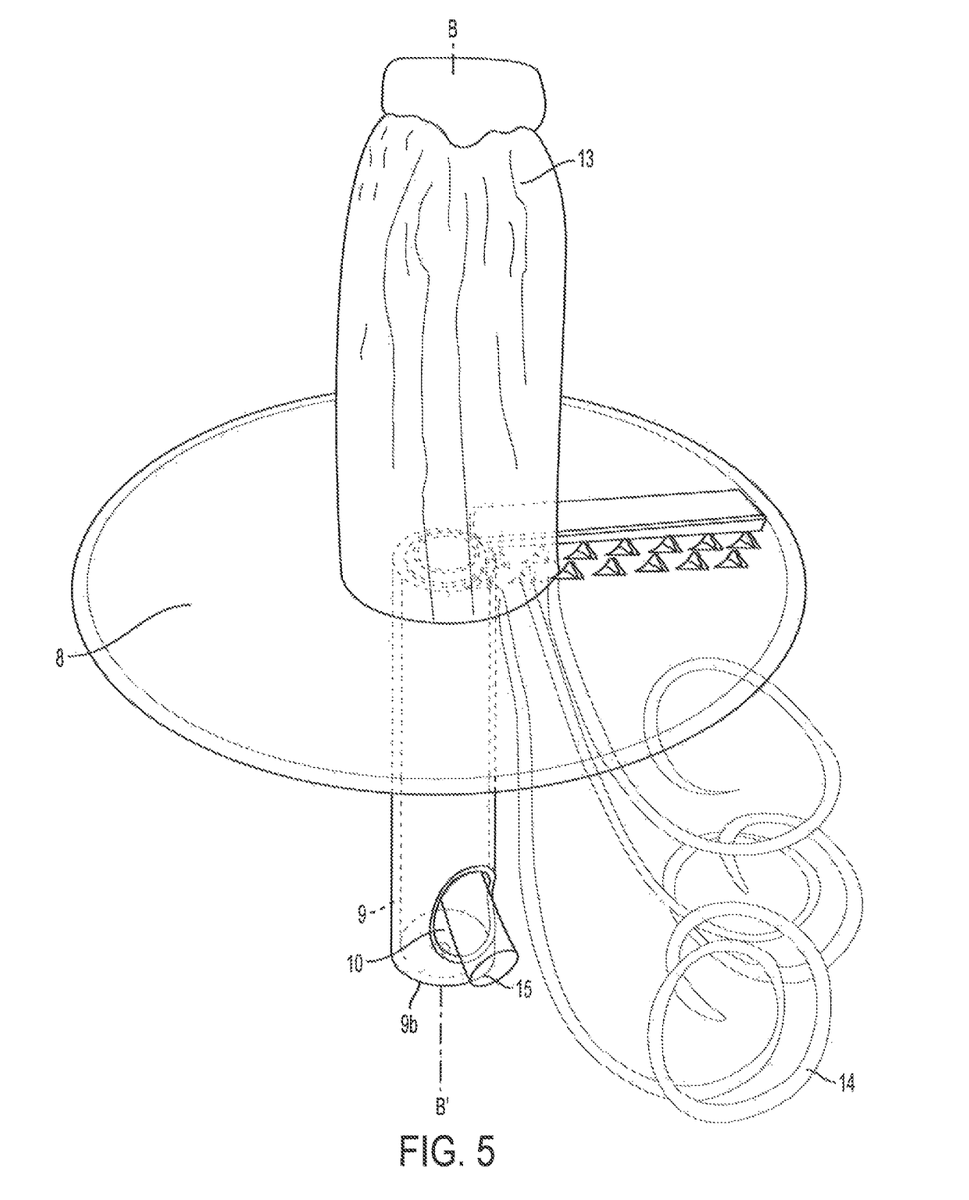
FIG. 5 is a side a side off-angle perspective view of a spiralizer cutter on a decore tube spindle receiving a food ingredient that is useful for understanding the invention.

FIG. 5 is a side a side off-angle perspective view of a spiralizer cutter on a decore tube receiving a food ingredient that is useful for understanding the invention. As shown in FIG. 5, a clockwise rotating spiralizer cutter 8 can spiral cut a food ingredient 13 into spiral strips 14 and together with the decore tube 9 remove the core 15 as the food ingredient 13 is provided into the decore tube 9 and the spiralizer cutter 8 along axis B-B'. That is, as both the decore tube 9 and the spiralizer cutter 8 are rotated about the axis B-B', spiral strips 14 can be cut by the spiralizer cutter 8 and the core 15 can be extrude from an opening 10 in the decore tube 9 as the food ingredient 13 is provided into the decore tube 9 and the spiralizer cutter 8 along axis B-B'.

Figure 6:
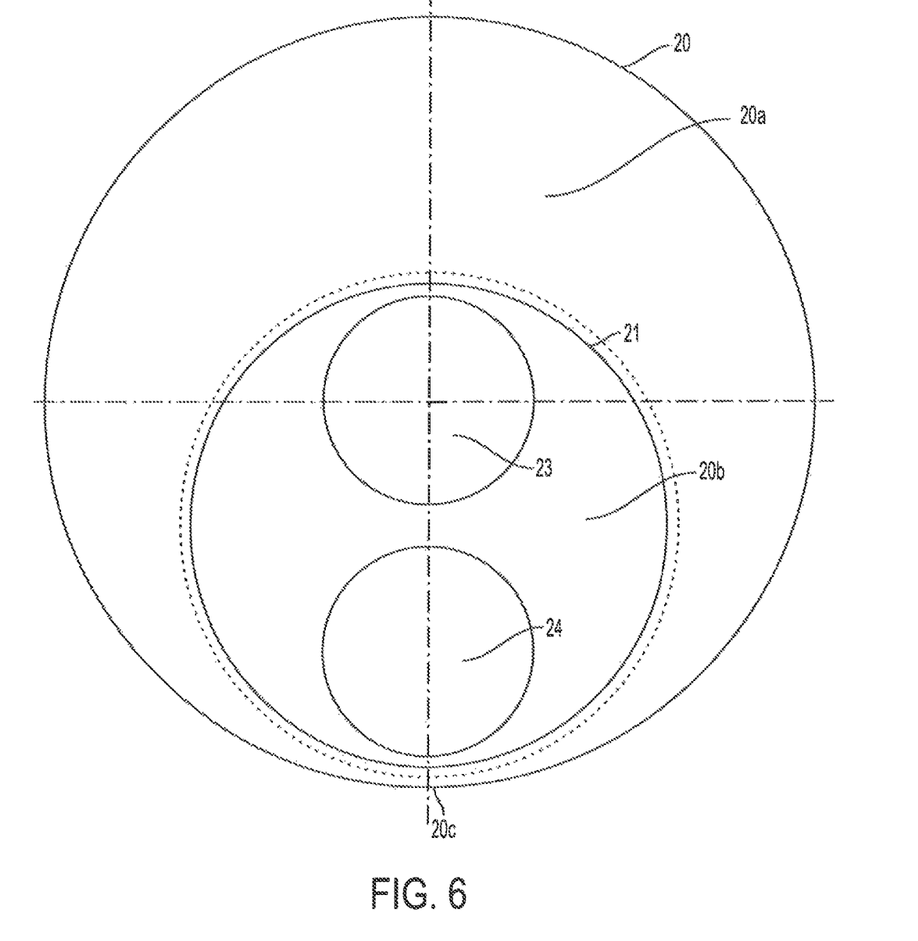
FIG. 6 is a top view of a lid for a food processor with a central opening and a radial opening in a recess of the lid that is useful for understanding the invention.

FIG. 6 is a top view of a lid for a food processor with a central opening and a radial opening in a recess of the lid that is useful for understanding the invention. As shown in FIG. 6, a lid 20 can have a top surface 20a with a circular recess 20b in which an edge portion 21 of the top surface 20a overlaps the recess 20b. The recess 20b of the lid 20 has a central opening 23 and a radial opening 24. The central opening 23 in the recess 20b of the lid 20 can be at the center or the central position of the lid 20, as shown in FIG. 6. The radial opening 24 in the recess 20b of the lid 20 can be located at a radial position between the central opening 23 and edge 20c of the lid 20. The circular recess 20b can receive a circular cover (not shown) held in place by the edge portion 21.

Figure 7:
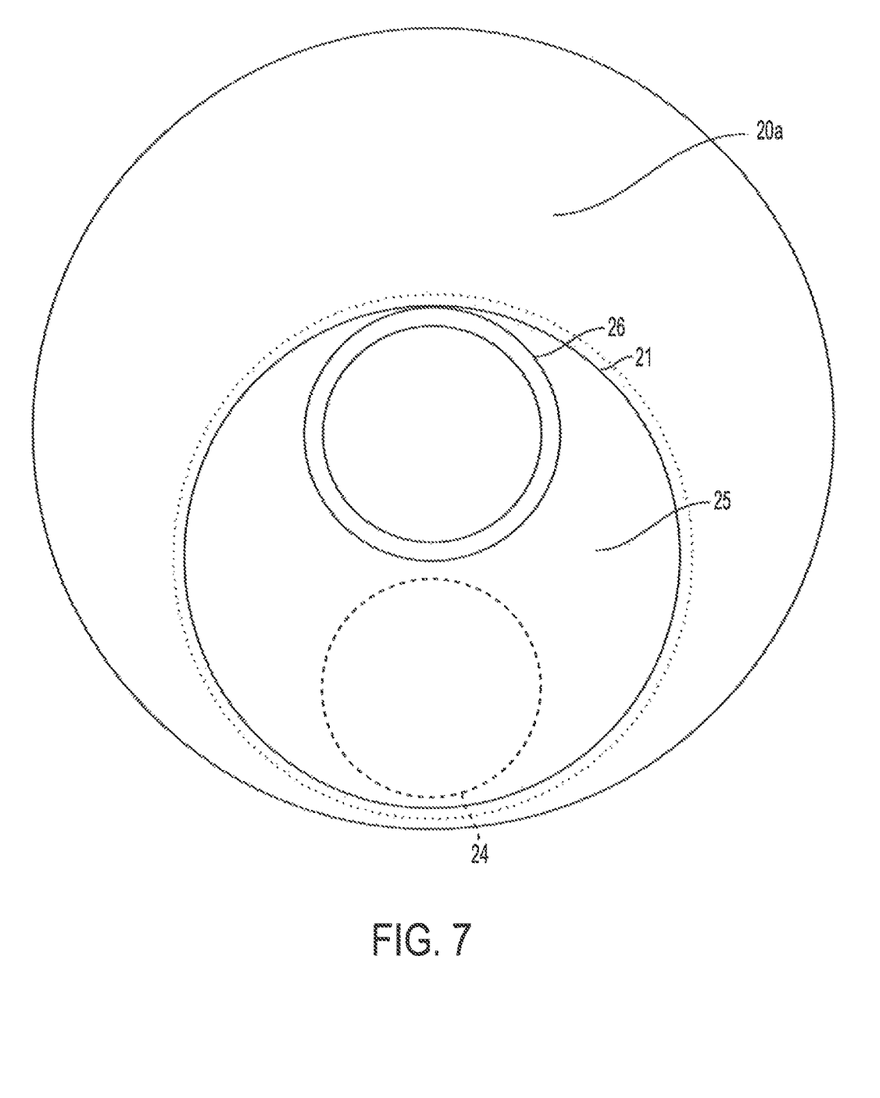
FIG. 7 is a top view of a cover and lid for a food processor with the feed tube of the cover in a central position that is useful for understanding the invention.

FIG. 7 is a top view of a cover and lid for a food processor with the feed tube of the cover in a central position that is useful for understanding the invention. As shown in FIG. 7, a cover 25 can be positioned under the edge portion 21 of the top surface 20a and within the recess (not shown in FIG. 7 but shown in FIG. 6). The cover 25 can have feed tube 26 aligned with the central opening (not shown in FIG. 7 but shown in FIG. 6) of the lid 20. The feed tube 26 can be on one side of the cover 25 and the other side of the cover 25 can extend over the radial opening 24 of the lid 20 so as to cover or overlap the radial opening 24 of the lid 20. The cover 25 can be rotatable under the edge portion 21 of the lid 20 such that the feed tube 26 can be positioned to be aligned with the central opening (not shown in FIG. 7 but shown in FIG. 6) or the radial opening 24.

Figure 8:
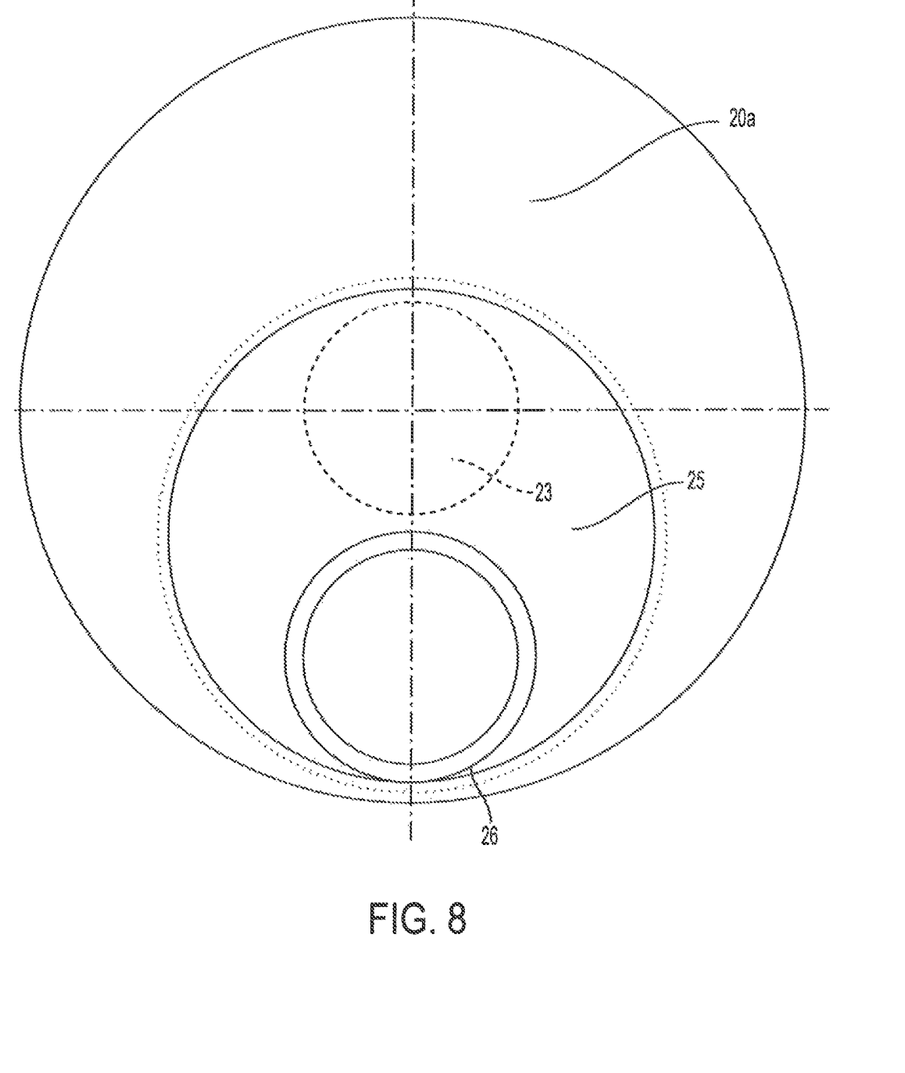
FIG. 8 is a top view of a cover and lid for a food processor with the feed tube of the cover in a radial position that is useful for understanding the invention.

FIG. 8 is a top view of a cover and lid for a food processor with the feed tube of the cover in a radial position that is useful for understanding the invention. As shown in FIG. 8, a cover 25 can be positioned under the edge portion 21 of the top surface 20a and within the recess (not shown in FIG. 8 but shown in FIG. 6). The cover 25 can have feed tube 26 aligned with the radial opening (not shown in FIG. 8 but shown in FIG. 7) of the lid 20. The feed tube 26 can be on one side of the cover 25 and the other side of the cover 25 can extend over the central opening 23 of the lid 20 so as to cover or overlap the central opening 23 of the lid 20. Rotating the cover 25 can enable the feed tube 26 to be positioned to be either one of the central opening 23 and the radial opening (not shown in FIG. 8 but shown in FIG. 7) while covering or overlapping the other one of the central opening 23 and the radial opening (not shown in FIG. 8 but shown in FIG. 7) with the other side of the cover 25.

It will be apparent to those skilled in the art that various modifications and variations can be made in the embodiments of the invention without departing from the spirit or scope of the invention. Thus, it is intended that embodiments of the invention cover the modifications and variations of this invention provided they come within the scope of the appended claims and their equivalents.

What is claimed is:

1. A food processor for cutting a food ingredient, comprising:
    a motorized base for generating a rotational force;
    a processor bowl removably attached to the motorized base;
    a spindle within the processor bowl in which the spindle can be rotated by the rotational force from the motorized base;
    a spiralizer cutter attached to the spindle within the processor bowl, the spiralizer cutter including a vertical blade positioned about a central axis of rotation and a horizontal blade positioned along a radius of the spiralizer cutter;

a lid positionable on the processor bowl, the lid including a feed tube movable between a center position and a radial position, wherein in the center position the feed tube is aligned with the central axis of rotation of the spiralizer cutter, and in the radial position the feed tube is positioned proximate an edge of the lid.

2. The food processor of claim 1, wherein the spindle is a tube having a top opening at an end of the tube and a side opening at a side of the tube.

3. The food processor of claim 1, wherein the lid includes central opening substantially aligned with the central axis of rotation of the spiralizer cutter, and radial opening positioned proximate an edge of the lid.

4. The food processor of claim 3, further comprising a cover rotatable mounted onto the lid, wherein the feed tube is connected to the cover.

5. The food processor of claim 4, wherein when the cover is in a first position, the feed tube is aligned with the central opening of the lid and the cover covers the radial opening of the lid.

6. The food processor of claim 5, wherein when the cover is in a second position, the feed tube is aligned with the radial opening of the lid and the cover covers the central opening of the lid.

\* \* \* \* \*